United States Patent
Mariappan et al.

(10) Patent No.: US 10,296,782 B2
(45) Date of Patent: May 21, 2019

(54) PROCESSING DEVICE AND METHOD FOR FACE DETECTION

(71) Applicant: Huawei Technologies Co., Ltd., Shenzhen (CN)

(72) Inventors: Vijayachandran Mariappan, Bangalore (IN); Rahul Arvind Jadhav, Bangalore (IN); Puneet Balmukund Sharma, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 15/416,533

(22) Filed: Jan. 26, 2017

(65) Prior Publication Data

US 2017/0161549 A1 Jun. 8, 2017

Related U.S. Application Data

(63) Continuation of application No. PCT/CN2015/071466, filed on Jan. 23, 2015.

(30) Foreign Application Priority Data

Aug. 7, 2014 (IN) .......................... 3891/CHE/2014

(51) Int. Cl.
*G06K 9/00* (2006.01)
*G06T 7/11* (2017.01)
(Continued)

(52) U.S. Cl.
CPC ..... *G06K 9/00234* (2013.01); *G06K 9/00228* (2013.01); *G06K 9/00288* (2013.01);
(Continued)

(58) Field of Classification Search
CPC .......... G06K 9/00228; G06K 9/00234; G06K 9/00281; G06K 9/6282; G06K 9/00288;
(Continued)

(56) References Cited

U.S. PATENT DOCUMENTS

| | | | |
|---|---|---|---|
| 5,715,325 A | 2/1998 | Bang et al. | |
| 6,574,354 B2 | 6/2003 | Abdel-Mottaleb et al. | |

(Continued)

FOREIGN PATENT DOCUMENTS

| | | |
|---|---|---|
| CN | 101923637 A | 12/2010 |
| CN | 103489174 A | 1/2014 |
| CN | 103824049 A | 5/2014 |

OTHER PUBLICATIONS

Köstinger, Martin, et al. "Robust face detection by simple means." DAGM 2012 CVAW workshop. 2012.*

(Continued)

*Primary Examiner* — Li Liu
(74) *Attorney, Agent, or Firm* — Conley Rose, P.C.

(57) ABSTRACT

A method for detecting a presence of at least one face in at least one image is comprises creating an image patch map based on a plurality of face patches identified for at least one window in the in at least one image, estimating a bounding box, and searching within the bounding box to detect presence of the at least one face in the at least one image. The present disclosure discloses use of any classifier which works on top of any feature representation to identify face patches and then using a masking system to identify bounding boxes.

15 Claims, 10 Drawing Sheets

(51) Int. Cl.
  *G06K 9/46* (2006.01)
  *G06K 9/66* (2006.01)
  *G06K 9/32* (2006.01)

(52) U.S. Cl.
  CPC ......... *G06K 9/3233* (2013.01); *G06K 9/4604* (2013.01); *G06K 9/4642* (2013.01); *G06K 9/66* (2013.01); *G06T 7/11* (2017.01); *G06K 2009/4666* (2013.01); *G06T 2207/30201* (2013.01)

(58) Field of Classification Search
  CPC .. G06K 9/621; G06T 2207/30201; G06T 7/11
  See application file for complete search history.

(56) References Cited

U.S. PATENT DOCUMENTS

| | | | | |
|---|---|---|---|---|
| 9,633,249 | B2* | 4/2017 | Csefalvay | G06T 7/90 |
| 2003/0202105 | A1* | 10/2003 | Gaubatz | G06K 9/0061 |
| | | | | 348/207.99 |
| 2004/0017930 | A1 | 1/2004 | Kim et al. | |
| 2007/0154096 | A1* | 7/2007 | Cao | G06K 9/00234 |
| | | | | 382/190 |
| 2008/0309629 | A1* | 12/2008 | Westerman | G06F 3/038 |
| | | | | 345/173 |
| 2010/0284577 | A1* | 11/2010 | Hua | G06K 9/00281 |
| | | | | 382/118 |
| 2011/0001850 | A1* | 1/2011 | Gaubatz | G06K 9/00228 |
| | | | | 348/241 |
| 2014/0044359 | A1 | 2/2014 | Rousson | |
| 2014/0241623 | A1* | 8/2014 | Wang | G06K 9/6257 |
| | | | | 382/160 |
| 2015/0110352 | A1* | 4/2015 | Csefalvay | G06K 9/00234 |
| | | | | 382/103 |
| 2015/0186748 | A1* | 7/2015 | Cootes | G06K 9/6282 |
| | | | | 382/159 |
| 2015/0243031 | A1* | 8/2015 | Narasimha | G06T 7/0042 |
| | | | | 382/103 |
| 2015/0347822 | A1* | 12/2015 | Zhou | G06K 9/4628 |
| | | | | 382/118 |

OTHER PUBLICATIONS

Ahonen, T., et al., "Face Description with Local Binary Patterns: Application to Face Recognition," IEEE Transactions on Pattern Analysis and Machine Intelligence, vol. 28, No. 12, Dec. 2006, 5 pages.

Froba, B., et al., "Face Detection with Modified Census Transform," Proceedings of the Sixth IEEE International Conference on Automatic Face and gesture Recognition, 2004, 6 pages.

Ozuysal, M., et al., Pose Estimation for Category Specific Multiview Object Localization, IEEE Conference on Computer Vision and Pattern Recognition, Jun. 20-25, 2009, pp. 778-785.

Venkatesh, V., et al., "Fast Bounding Box Estimation based Face Detection," 2010 14 pages.

Viola, P., et al., Rapid Object Detection using a Boosted Cascade of Simple Features, Proceedings of the IEEE Computer Society Conference on Computer Vision and Pattern Recognition, Dec. 8-14, 2001, pp. 511-518.

Foreign Communication From a Counterpart Application, PCT Application No. PCT/CN2015/071466, English Translation of International Search Report dated May 12, 2015, 4 pages.

Garcia, C., et al., "Face Detection Using Quantized Skin Color Regions Merging and Wavelet Packet Analysis," IEEE Transactions on Multimedia, vol. 1, No. 3, Sep. 1999, pp. 264-277.

Foreign Communication From a Counterpart Application, European Application No. 15830572.2, Partial Supplementary European Search Report dated Jul. 4, 2017, 14 pages.

Machine Translation and Abstract of Chinese Publication No. CN103489174, Jan. 1, 2014, 17 pages.

Foreign Communication From A Counterpart Application, Chinese Application No. 2015800261818, Chinese Office Action dated Jan. 31, 2019, 6 pages.

Foreign Communication From A Counterpart Application, Chinese Application No. 2015800261818, Chinese Search Report dated Jan. 31, 2019, 2 pages.

* cited by examiner

PROCESSING DEVICE AND METHOD FOR FACE DETECTION

CROSS-REFERENCE TO RELATED APPLICATIONS

This application is a continuation of International Application No. PCT/CN2015/071466, filed on Jan. 23, 2015, which claims priority to Indian Patent Application No. IN3891/CHE/2014, filed on Aug. 7, 2014, both of which are hereby incorporated by reference in their entireties.

TECHNICAL FIELD

The present disclosure relates to the field of image processing, and in particular, to a face-detection processing method and a processing device for face detection.

BACKGROUND

Face detection is an important research direction in the field of computer vision because of its wide potential applications, such as video surveillance, human computer interaction, face recognition, security authentication, and face image database management etc. Face detection is to determine whether there are any faces within a given image, and return the location and extent of each face in the image if one or more faces are present.

Today, high definition (HD) cameras are an affordable commodity and are being widely used in all types of applications, video surveillance, for instance. Video analytics in the form of face detection has to match the high resolution output from the cameras and thus the performance of these algorithms is extremely critical for overall performance of analytics.

Face detection algorithms are usually employed in smart phones, bio-metric devices to detect the face and later recognize them. All smart phones today are equipped with a feature wherein it can unlock the phone by matching the faces. This application requires a fast face detection algorithm at its core. The exemplary output of a face detection engine is shown in FIG. 1.

A face detection framework which is essentially an Adaptive Boosting (AdaBoost) based cascaded classifier subsystem and has produced excellent accuracy with real-time performance. AdaBoost is a machine learning meta-algorithm which may be used in conjunction with many other types of learning algorithms to improve their performance. This performance though is directly proportional to the resolution of the image/video frame.

The general overall process of face detection algorithm is shown in FIG. 2 and the modules of any face detection algorithm includes but not limited to:

Feature representation module: Any face detection system uses some sort of feature representation which can identify facial features and correlate them in way such that overall output can be judged as a face or a non-face. Examples of feature representations are, Local Binary Patterns (LBP) and Modified Census Transform (MCT). These are alternative representations (in place of pixel intensity) which usually have better invariance to illumination, slight changes in pose/expressions.

Classifier module: Classifier provides a way to correlate multiple features. Examples are Cascaded Adaboost Classifier and Support Vector Machines (SVM).

Search space generator module: Given an image/video frame, a face can be present at any "location" and at any "scale". Thus the face detection logic has to search (using a sliding window approach) for the possibility of the face "at all locations" and "at all the scales". This usually results in scanning of hundreds of thousands of windows even in a low resolution image.

Also there are various algorithms like bounding box based algorithms that tries to identify the bounding box within which there is a possibility of a face to be detected. Thus the face detection classifier now has to search only within this bounding box and thus improves the speed of detection dramatically. The estimated bounding box and the face box as shown in FIG. 3.

However, it may be understood that it is not necessary to always find a face within the estimated bounding box. Secondly the estimated bounding box might not be centered on the face.

The sliding window approach is the most common technique to generate search space used for objects detection. A classifier is evaluated at every location, and an object is detected when the classifier response is above a preset threshold. Cascades speed up the detection by rejecting the background quickly and spending more time on object like regions. Although cascades were introduced, scanning with fine grid spacing is still computationally expensive.

To increase the scanning speed one approach is to train a classifier with perturbed training data to handle small shifts in the object location. But this significantly increases the number of weak classifiers required in the overall model since the training data will be noisy (unaligned/perturbed).

Another simple approach is to increase the grid spacing (decreases the number of windows being evaluated). Unfortunately, as the grid spacing is increased the number of detection decreases rapidly.

As shown in FIG. 4, in the graph (bottom line), we can see that as the grid spacing increases there is an exponential drop in the accuracy of the regular full face classifier.

A technique to reduce the number of miss detections while increasing the grid spacing when using the sliding window approach for object detection also exists.

The disclosed technique trains a classifier (Cpatch) using decision tree and this Cpatch classifier is evaluated on a regular grid, while the main classifier (Cobject) is placed on location predicted by Cpatch. The left hand side (LHS) of FIG. 5 shows a sample face with different patch locations shown in different dashed rectangles. A patch is of size $W_P \times h_P$ and all the patches are given as an input to the decision tree, where $w_p$ is the width of the path and $h_p$ is the height of the patch. The leaf nodes of the decision tree corresponds to patches that have been identified. The right hand side (RHS) of FIG. 5 shows patches identified on leaf nodes and the corresponding offsets for the full face.

The core idea of this technique is to use a decision tree based approach using very light-weight and simple features such as pixel intensity value and then use this Cpatch classifier as a pre-processing step. The actual Cobject classifier works only on the output from the Cpatch classifier. Thus if the Cpatch classifier is able to remove bulk of the windows then the Cobject classifier has relatively less work to be done resulting in improved performance. The face bounding box for faster face detection technique is shown in FIG. 5.

There are other approaches which are based on skin color segmentation to speed up the face detection algorithms. These techniques try to check the portion of image where the skin color is found and then try to apply face detection only on that pockets/sub windows.

However, the technique that is discussed above results in loss of accuracy. As shown in FIG. 4 the lines shows the data of an available techniques for face detection using the sliding window approach for object detection. It improves the accuracy but still is lower than the desirable. For e.g. at 6×6 grid spacing the accuracy is shown to be about 80 percent (%) which is down by almost 15-18% from peak. Even though all the disclosed techniques and the available techniques for face detection are used for accurate face detection, they still have a massive drawback of an amount of time that is spent in the detection process and reducing the processing time with higher accuracy rate. Further, the existing image processing or face detection algorithms requires high end processing, and accordingly requires a high end processing advanced hardware which involves higher cost. Furthermore, as the image processing or face detection algorithm requires high end processing, the usage of central processing unit (CPU) for this purpose is also increased in the process.

In view of the drawbacks and limitation discussed above, there exists a need to provide an efficient technique for face detection with higher accuracy of detection, less processing time and the technique must work on low-cost hardware and must have low CPU usage.

SUMMARY

This summary is provided to introduce concepts related a processing device and method for faster face detection and the concepts are further described below in the detailed description. The above-described problems are addressed and a technical solution is achieved in the present disclosure by providing a face-detection processing methods, and processing devices for faster face detection.

The present disclosure, in various embodiments, provide a face-detection processing method, and processing devices for faster face detection.

In one implementation, in view of the difficulties discussed above, the objective of this disclosure is to provide an image processing method which is able to detect a presence of at least one face in at least one image, which will not require a large memory capacity, which will be capable of performing high-speed processing in real time or offline, which can be produced at a low cost, which can detect specified patterns with certainty, with a very small probability of false positives.

In one implementation, a face detection method that may be used even on lower end hardware is disclosed. This technique ensures that a very low CPU usage is done for face detection method and thus can be employed on low-cost hardware.

In one implementation, an efficient technique to estimate the bounding box for the faces in the image such that the subsequent full face classifier can be applied within the bounding box only.

In one implementation, the technique disclosed in the present disclosure involves sliding the search window at higher pixel-shifts such that the total numbers of windows scanned are highly reduced.

In one implementation, a mechanism to locate face patches when the sliding pixel-shifts are increased and thus not impacting the output of the overall face classifier is disclosed. In a regular face detection system, the grid spacing used is 1×1 i.e. 1 pixel shift in each (x,y) direction. The present disclosure disclosed achieves a grid spacing of 6×6 i.e. the sliding window is shifted with 6 pixels in both x and y directions. This achieves an overall reduction/ window compression of 36:1 i.e. in ideal scenarios the performance increase can be ~36 (6×6) times.

In one implementation, a specific consideration is given to maintain the accuracy of the present technique even at higher pixel shifts.

In one implementation, the technique to identify face patches rather than full face to estimate the bounding box at higher pixel shifts and then using this bounding box to search for the presence of a face is disclosed.

Accordingly, in one implementation, a method for detecting a presence of at least one face in at least one image is disclosed. The method comprises of creating an image patch map based on a plurality of face patches identified for at least one window in said in at least one image, estimating a bounding box, and searching within said bounding box to detect presence of said at least one face in said at least one image.

In one implementation, a processing device is disclosed. The processing device comprises of memory storing instructions which, when executed by one or more processors, cause the one or more processors to perform operations that comprises of creating an image patch map based on a plurality of face patches identified for at least one window in at least one image, estimating a bounding box, and searching within said bounding box to detect presence of at least one face in said at least one image, is disclosed. The said non-transitory computer readable storage medium storing instructions and said one or more processors are a part of a processing device.

In one implementation, a processing device is disclosed. The processing device comprises of one or more storages capable of storing one or more images and other data; and a face detector. The processing device is configured to perform operations that comprises of creating an image patch map based on a plurality of face patches identified for at least one window in the one or more images, estimating a bounding box, and searching within the bounding box to detect presence of the at least one face in the one or more images.

In one implementation, creating the image patch map comprises of identifying the plurality of face patches for the at least one window, wherein the at least one window is a detected face region of the at least one face, training a patch classifier using the plurality of face patches identified, evaluating the patch classifier trained, and applying the patch classifier on said windows using a pre-defined grid spacing, thereby creating the image patch map.

In one implementation, the present disclosure provides certain advantages that may include but not limited to:

The present disclosure improves face detection time multi-fold without impacting the accuracy.

The present disclosure may be used in real-time systems even with HD videos/images.

The present disclosure is suitable for generic object detection and not constrained to face domain.

These and other features and advantages will become apparent from the following detailed description of illustrative embodiments thereof, which is to be read in connection with the accompanying drawings.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

Corresponding reference characters indicate corresponding parts throughout the several views. The exemplification set out herein illustrates preferred embodiments of the disclosure, in one form, and such exemplification is not to be construed as limiting the scope of the disclosure in any manner.

It is to be understood that the attached drawings are for purposes of illustrating the concepts of the disclosure and may not be to scale.

DETAILED DESCRIPTION

In order to make the aforementioned objectives, technical solutions and advantages of the present disclosure more comprehensible, embodiments are described below with accompanying figures.

The objects, advantages and other novel features of the present disclosure will be apparent to those skilled in the art from the following detailed description when read in conjunction with the appended claims and accompanying drawings.

Processing devices and methods for faster face detection are described. The present technique disclosed uses a patch based approach for identification of the face patch and then applying a full face classifier in the bounding box.

The present technique is characterized in the way the patches are formed, the features that are used to train on the patches and the way the bounding box is defined.

Figure 1:
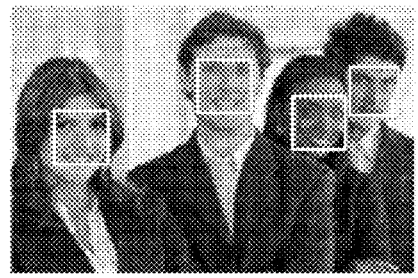
FIG. 1 illustrating an output of a face detection engine, is shown, in accordance with an embodiment of the present subject matter.
Figure 2:
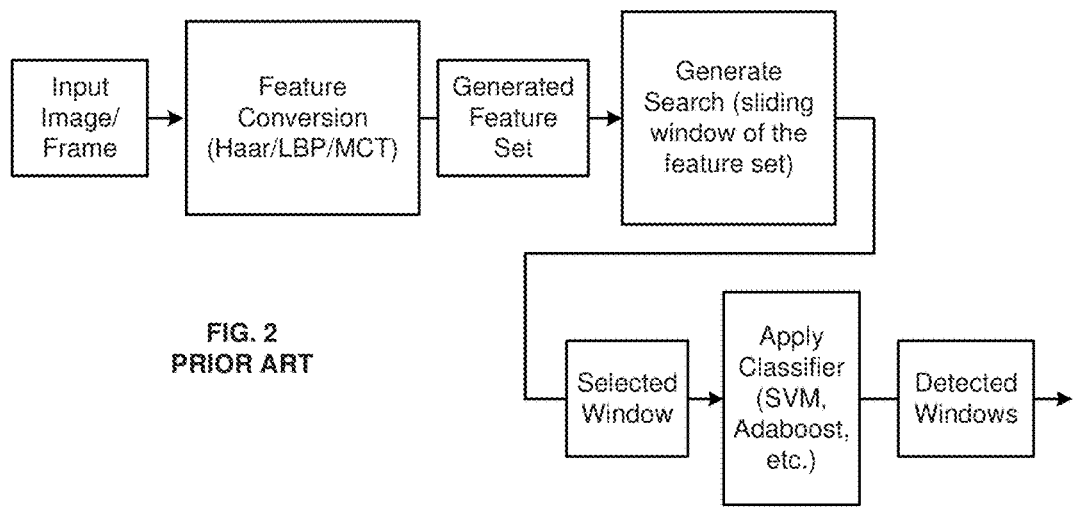
FIG. 2 illustrating a flow of face detection algorithm is shown, in accordance with an embodiment of the present subject matter.
Figure 3:
FIG. 3 illustrating an estimated Bounding box and the face box is shown, in accordance with an embodiment of the present subject matter.
Figure 4:
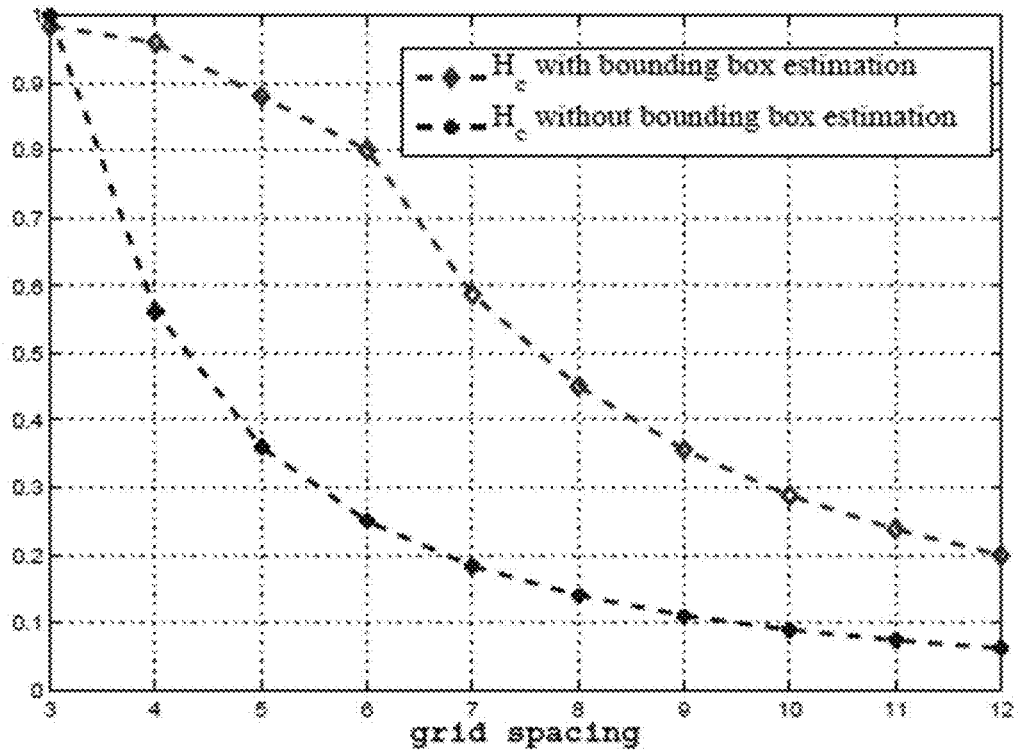
FIG. 4 illustrating a graph showing impact of grid spacing on detection accuracy is shown, in accordance with an embodiment of the present subject matter.
Figure 5:
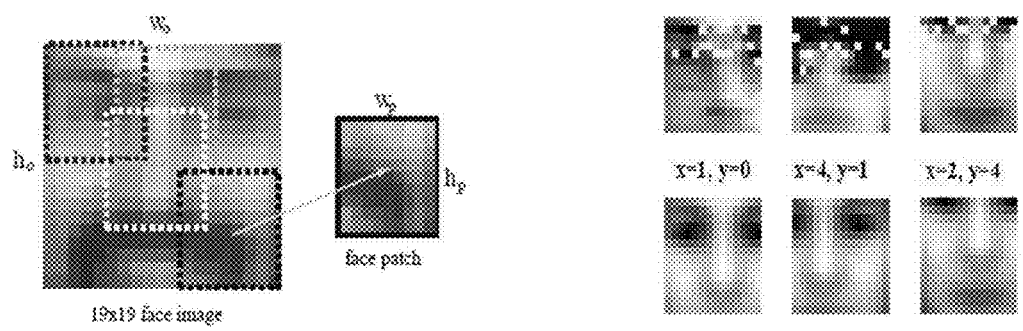
FIG. 5 illustrating a face bounding box for faster face detection is shown, in accordance with an embodiment of the present subject matter.
Figure 6:
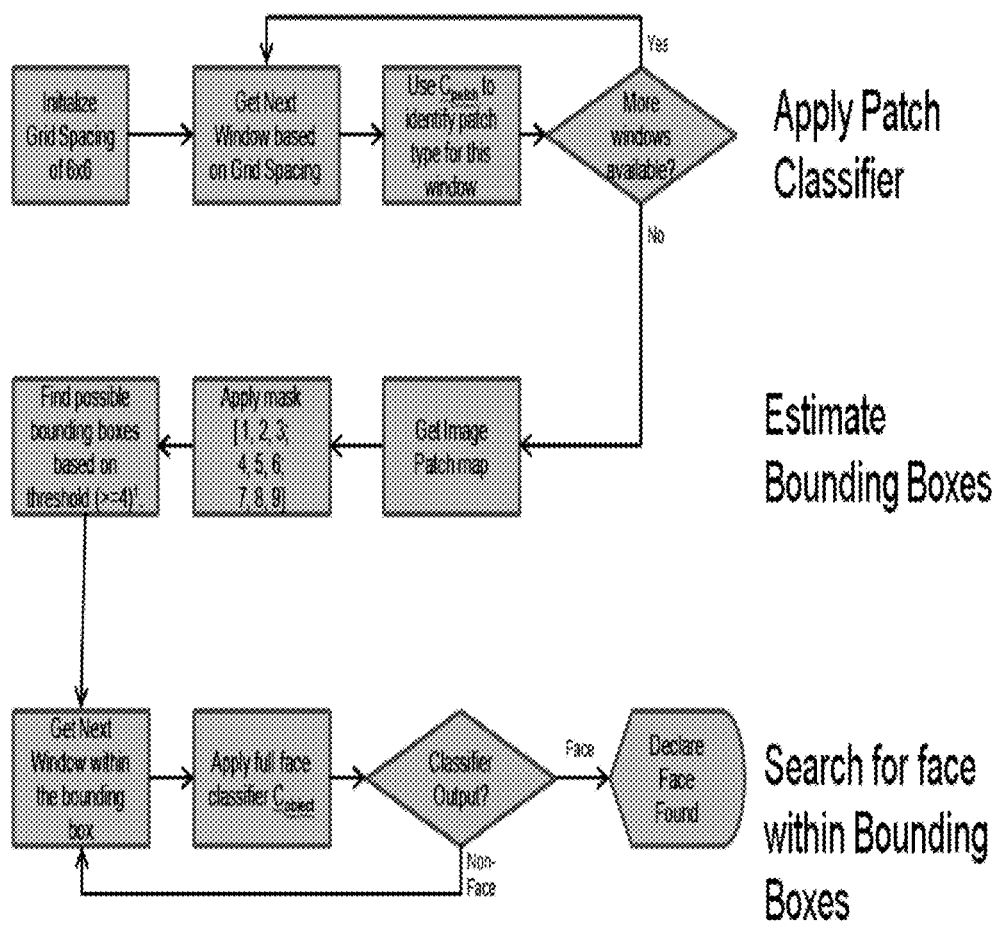
FIG. 6 illustrating a flow chart for face detection in present disclosure is shown, in accordance with an embodiment of the present subject matter.

In one implementation, the present technique may be categorized into three major steps as shown in FIG. 6:

Applying patch classifier step: Patch classifier is applied on windows derived by doing a grid spacing of 6×6.

Estimate bounding box step: We have an image map from the "Applying patch classifier step" as noted above and then a mask is applied which checks how many of the patches of the window actually mapped to the face patch.

Searching within bounding box step: Once the 36×36 bounding box is found, the method searches within that bounding box using an aggressive grid spacing of 1×1, wherein the grid spacing used is 1×1 i.e. 1 pixel shift in each (x,y) direction.

In one implementation a face template size is 24×24 and the patches are formed using 36×36 area centered on 24×24 face area. This area is assumed considering the worst case scenarios for 6×6 grid spacing. In one example, the face box is the actual area occupies by a face/object to be identified in the image. In one implementation, the face box may be obtained by any of the known face detector or detection technique available in the art.

Figure 8:
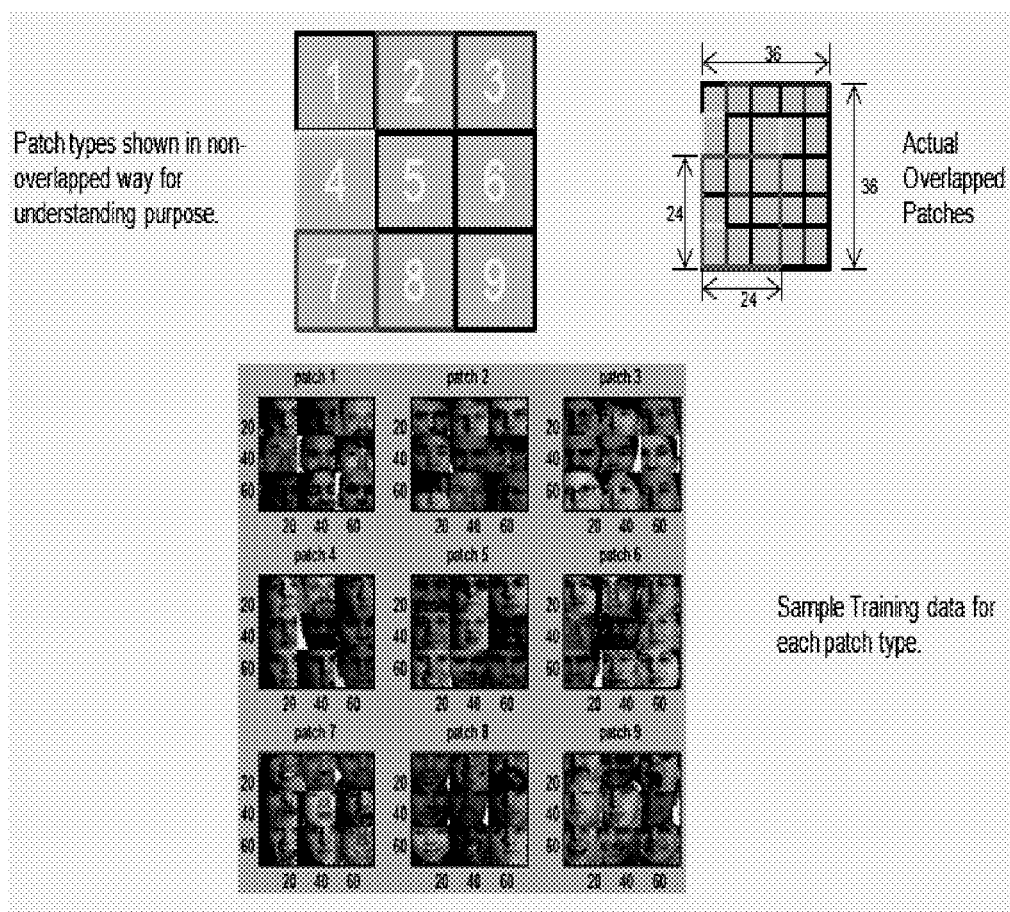
FIG. 8 illustrating face patch examples in present disclosure are shown, in accordance with an embodiment of the present subject matter.

In one implementation, training the patch classifier Cpatch is achieved by training a decision tree using the 9 different types of patch samples as shown in the FIG. 8. The leaf node of the tree will identify the patch type. An MCT technique may be used for feature representation rather than simple binary tests as mentioned in the earlier approach. For decision tree, the nodes are split based on one-versus (vs.)-all approach, i.e. one patch vs. the rest of the patches. Further, non-face samples in the training may not be used. It is understood that the goal of the Cpatch classifier is to identify the face patch accurately and not distinguish between face patch and non-faces.

In one implementation, evaluating the Cpatch classifier is achieved using the Cpatch classifier. The Cpatch is applied on classifier on all the windows with a grid spacing of 6×6. As every window gives some patch type, an image patch map based on the patch identified is created for every window at a grid spacing of 6×6. The image patches type and the formation is shown in FIG. 8. In one example, the image patch map may include different patch location information arranged in different rectangles. The patch may be of size 4×4, 6×6, 8×8, and so on, and all the patches are given as an input to the decision tree. The leaf nodes of the decision tree correspond to patches have been identified. In one example, the image patch map may include an arrangement of pixel locations of different patches. Further, the image patch map may be obtained by any of the existing techniques.

Figure 9:
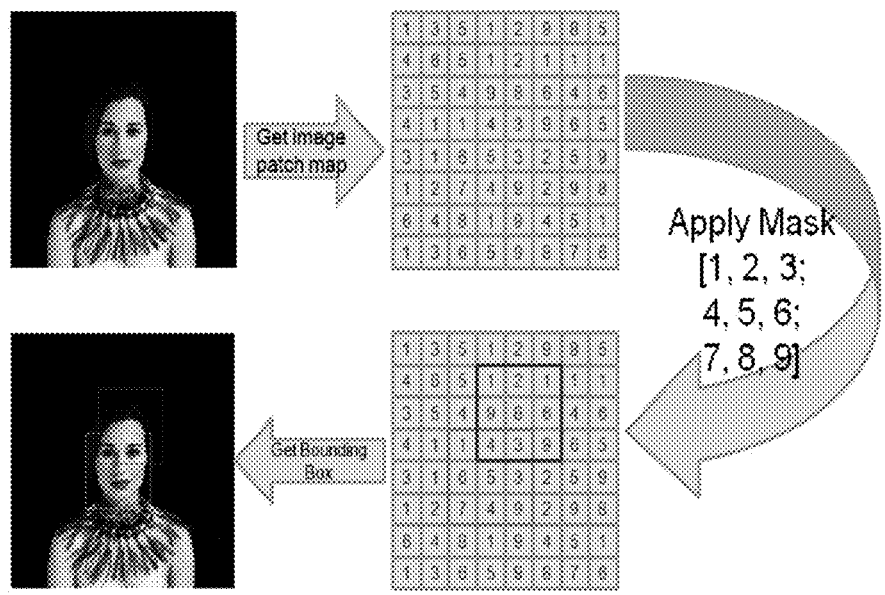
FIG. 9 illustrating a face patch masking operation in present disclosure is shown, in accordance with an embodiment of the present subject matter.

In one implementation, once the image patch map is obtained, a matrix mask of [1, 2, 3, 4, 5, 6, 7, 8, 9] is applied to check how many patches around the face have matched. In one implementation, a tolerance of 4 may be considered, i.e. if 4 or more types in the mask match then 36×36 area as a possible face bounding box is chosen. The face patch masking operation is shown in FIG. 9.

Figure 10:
FIG. 10 illustrating a subsequent localized search within bounding box in present disclosure is shown, in accordance with an embodiment of the present subject matter.

In one implementation, after the face bounding box is estimated, a local search within that bounding box is performed and in the worst case the number of 24×24 windows searched in the bounding box can be 36. As shown in FIG. 10, on the LHS, the bounding box that is estimated is shown and on RHS, a localized search done within the bounding box to identify the face is shown.

In one implementation, the present disclosure provides the usage of 6×6 grid spacing. The technical advantages of using this grid spacing are as follows.

The number of classified patches: In case of 6×6, the numbers of possible patches are 9 with an overlap area of 3 pixels. In case of 4×4 it (possible patches) will be more and in case of 8×8 it will be less. All of this is depending upon the overlapped area. This will result in too many or too less leaf nodes for classification and regression trees (CART) or Random forest classifier which is used for patch classification.

Background area covered: The chosen grid size may result in some of the background area being covered in the test/train images. Usually some pixels around the eyes and below the lips for a 24×24 face image are used. For bounding box the area is extended without actually zooming in the face image, thus this will mean that some of the background area such as ears, hair, chin will come into picture, if 8×8 size is used then more of background area may come into picture which will have adverse effect on the patch classifier output.

While aspects of described processing devices and methods for faster face detection may be implemented in any number of different computing systems, environments, and/or configurations, the embodiments are described in the context of the following exemplary system.

While illustrative embodiments of the present disclosure are described below, it will be appreciated that the present disclosure may be practiced without the specified details, and that numerous implementation-specific decisions may be made to the disclosure described herein to achieve the developer's specific goals, such as compliance with system-related and business-related constraints, which will vary from one system to other system such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present disclosure. Such descriptions and representations are used by those skilled in the art to describe and convey the substance of their work to others skilled in the art. The present disclosure will now be described with reference to the drawings described below.

Figure 11:
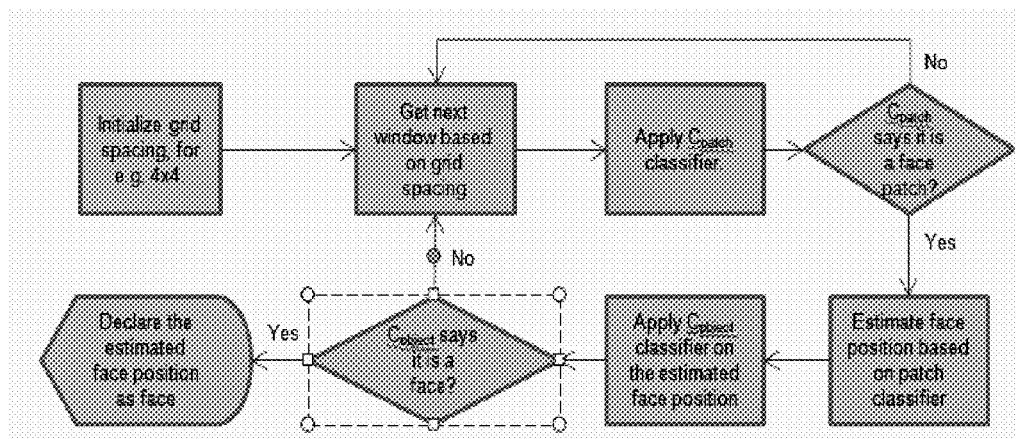
FIG. 11 illustrating a detection flow chart for bounding box based, is shown, in accordance with an embodiment of the present subject matter.

FIG. 11 illustrates a detection flow chart for bounding box based in accordance with an embodiment of the present subject matter.

Figure 12:
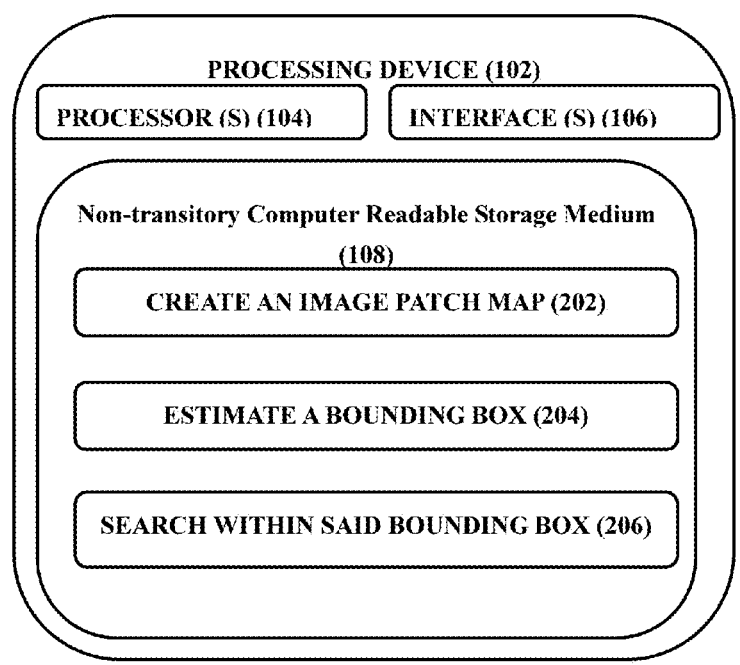
FIG. 12 illustrating an operation to detect presence of at least one face in the at least one image executed by one or more processors is shown, in accordance with an embodiment of the present subject matter.

FIG. 12 illustrates operations to detect presence of at least one face in the at least one image executed by one or more processors in accordance with an embodiment of the present subject matter.

In one implementation, a processing device is disclosed. The processing device comprises of non-transitory computer readable storage medium storing instructions which, when executed by one or more processors, cause the one or more processors to perform operations that comprise of creating an image patch map based on a plurality of face patches identified for at least one window in at least one image, estimating a bounding box, and searching within the bounding box to detect presence of at least one face in the at least one image, is disclosed. The non-transitory computer readable storage medium storing instructions and the one or more processors are a part of a processing device.

In one implementation, the image patch map is created using the steps of: identifying said plurality of face patches for the at least one window, wherein the at least one window is a detected face region of the at least one face, training a patch classifier using the plurality of face patches identified, evaluating the patch classifier trained, and applying the patch classifier on the windows using a pre-defined grid spacing, thereby creating the image patch map.

In one implementation, the plurality of face patches are identified using the at least one window surrounding a face box for identifying the plurality of face patches, wherein the at least one window size is holds the plurality of face patches in a face template centered on the face template size.

In one implementation, the at least one window size is preferably of 36×36, and the face template size is preferably of 24×24.

In one implementation, the pre-defined grid spacing is preferably of size 6×6.

In one implementation, the bounding box is estimated by applying a matrix mask on the image patch map to check at least one face patch from the plurality of face patches are mapped to the at least one face.

In one implementation, searching within the bounding box is a localized searching and is characterized using an aggressive grid spacing of size 1×1.

In one implementation, the non-transitory computer readable storage medium storing instructions performs a patch based approach for plurality of face patches identified for at least one window thereby applying a full face classifier in the bounding box.

In one implementation, wherein training the patch classifier is characterized by use of a decision tree using at least one face patch from the plurality of face patches to identify at least one patch type, and one-vs.-all approach, wherein one-vs.-all approach considers one face patch vs. the rest of face patches.

In one implementation, it is understood that the evaluation of the patch classifier is the evaluation of the trained classifier on the target image or input received image by the device on which face is detected. In one implementation there are two sets of images one from which the classifier learns that a particular structure is face and the other one which this classifier is applied. Evaluation usually is referred to the application of this trained classifier on the target image in which a face is to be detected.

Figure 13:
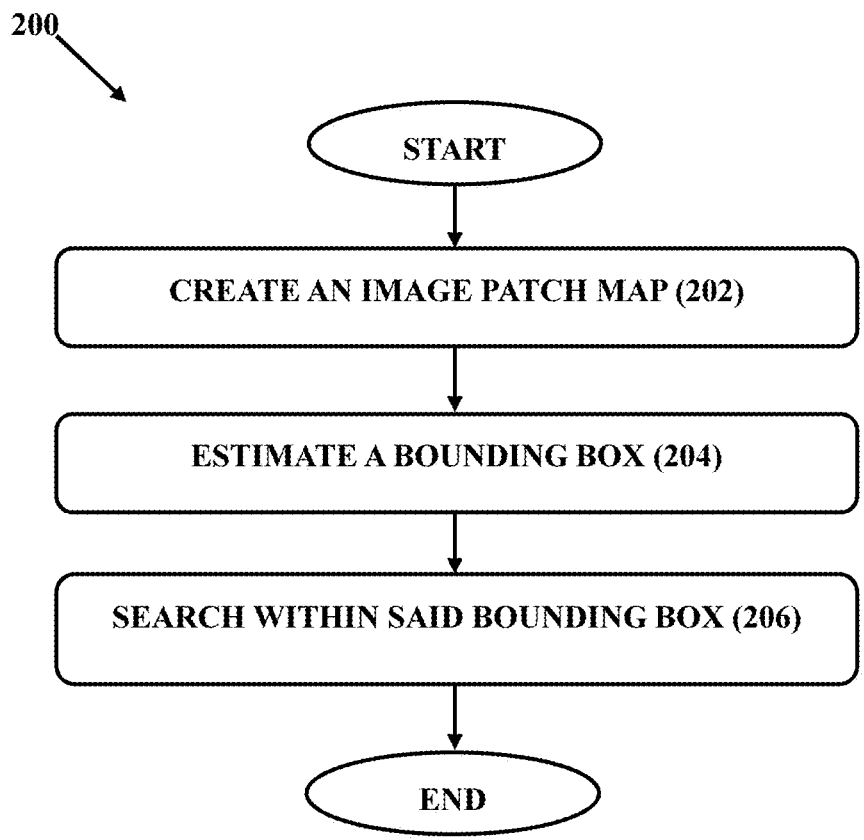
FIG. 13 illustrating a method for detecting a presence of at least one face in at least one image is shown, in accordance with an embodiment of the present subject matter.

FIG. 13 illustrating method 200 of detecting a presence of at least one face in at least one image is shown, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

Figure 7:
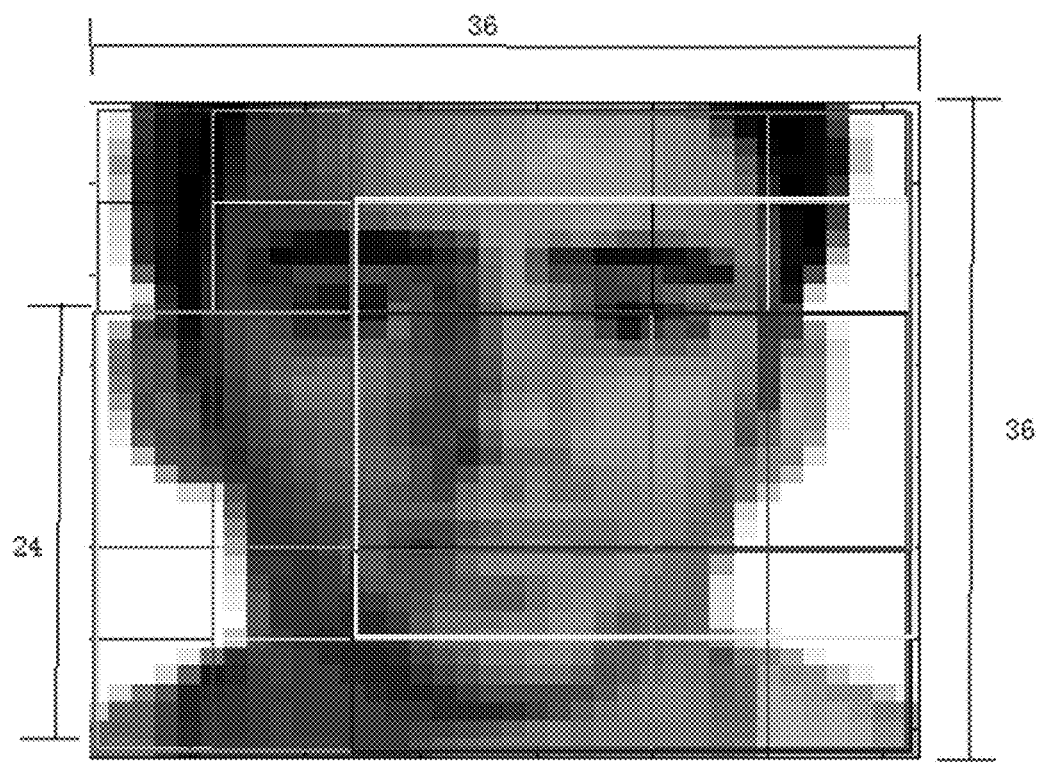
FIG. 7 illustrating a face patch classification in present disclosure is shown, in accordance with an embodiment of the present subject matter.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in described processing device 102 as shown in FIG. 7.

At step 202, an image patch map is created. In on implementation, the image map is created based on a plurality of face patches identified for at least one window in said in at least one image.

At step 204, a bounding box is estimated. In one implementation, the bounding box is estimated by applying 308 a matrix mask on the image patch map to check at least one face patch from the plurality of face patches are mapped to the at least one face, as shown in FIG. 9.

At step 206, the bounding box is searched to detect presence of the at least one face in the at least one image. In one implementation, searching within the bounding box is a localized searching and is characterized using an aggressive grid spacing of size 1×1.

Figure 14:
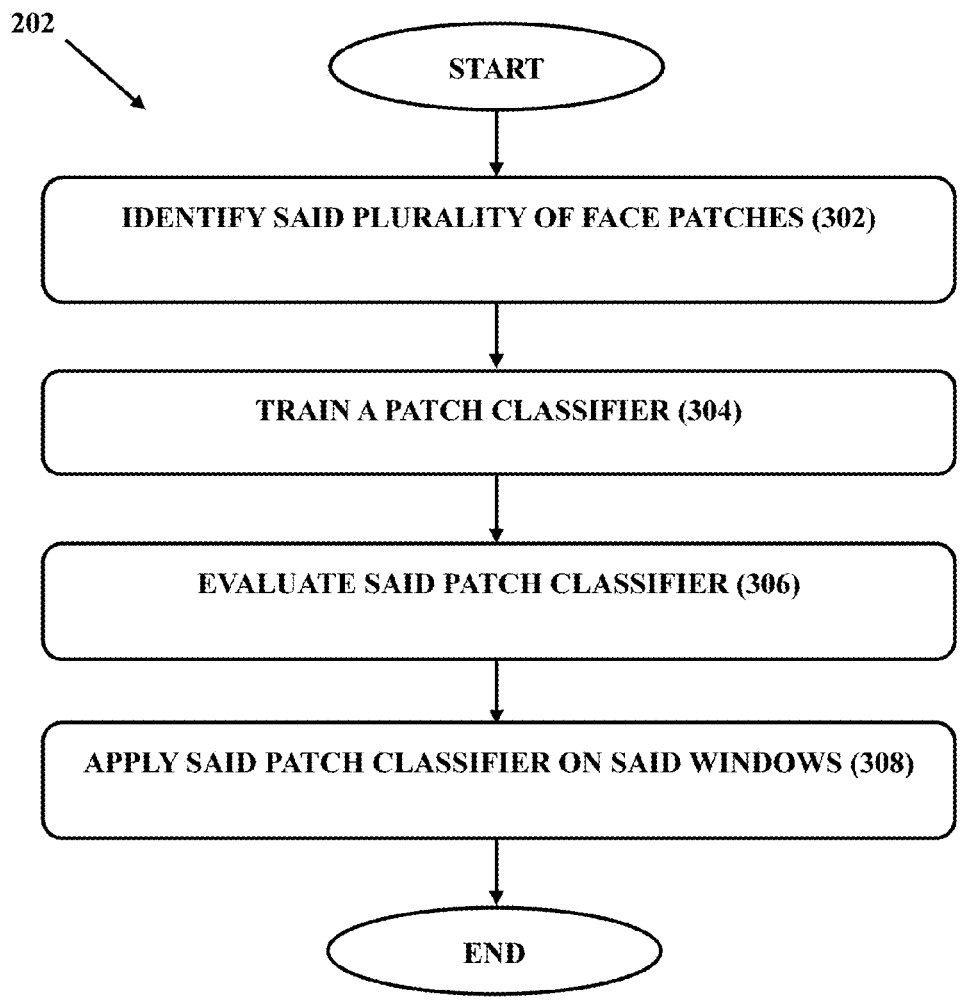
FIG. 14 illustrating a method for creating the image patch map is shown, in accordance with an embodiment of the present subject matter.

FIG. 14 illustrating a method for creating 202 the image patch map is shown, in accordance with an embodiment of the present subject matter.

At step 302, the plurality of face patches are identified for the at least one window. In one implementation, the at least one window is a detected face region of the at least one face. In one implementation, the plurality of face patches are identified using the at least one window surrounding a face box for identifying 302 the plurality of face patches, wherein the at least one window size holds the plurality of face patches in a face template centered on the face template size. In one implementation, the at least one window size is preferably of 36×36, and the face template size is preferably of 24×24.

At step 304, patch classifiers are trained using the plurality of face patches identified.

At step 306, the patch classifier trained are evaluated.

At step 308, the patch classifiers are applied on the at least one window using a pre-defined grid spacing, thereby creating 202 the image patch map. In one implementation, the pre-defined grid spacing is preferably of size 6×6.

Figure 15:
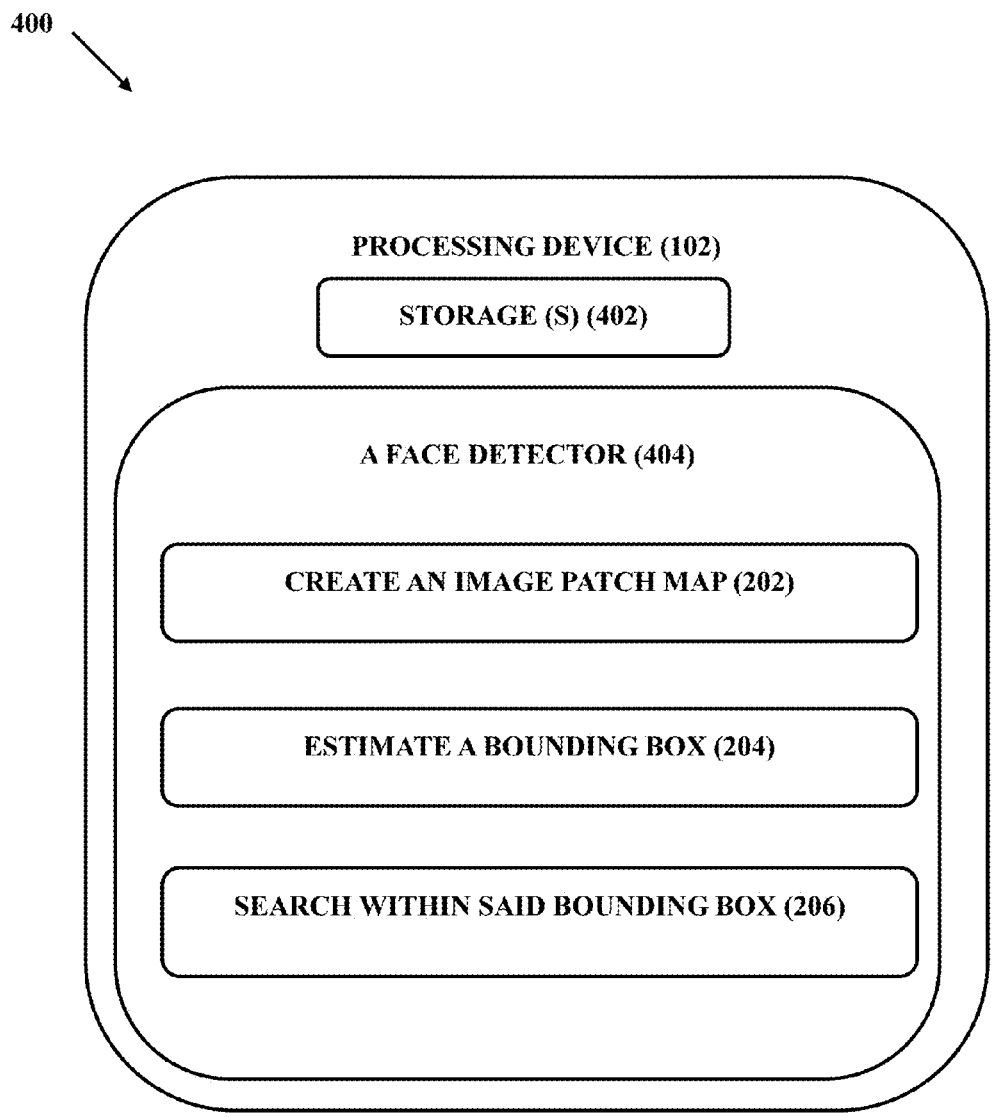
FIG. 15 illustrating a special purpose processing device for detecting a presence of at least one face in at least one image is shown, in accordance with an embodiment of the present subject matter.

FIG. 15 illustrating a special purpose processing device 102 for detecting a presence of at least one face in at least one image is shown, in accordance with an embodiment of the present subject matter.

In one implementation, a processing device 102 is disclosed. The processing device 102 comprises of one or more storages 402 capable of storing one or more images and other data, and a face detector 404. The processing device 102 is configured to perform operations that comprise of creating 202 an image patch map based on a plurality of face patches identified for at least one window in the one or more images, estimating 204 a bounding box, and searching 206 within the bounding box to detect presence of the at least one face in the one or more images.

In one implementation, the image patch map is created using the steps of identifying 302 the plurality of face patches for the at least one window, wherein the at least one window is a detected face region of the at least one face, training 304 a patch classifier using the plurality of face patches identified, evaluating 306 the patch classifier trained, and applying 308 the patch classifier on the windows using a pre-defined grid spacing, thereby creating 202 the image patch map.

In one implementation, the plurality of face patches are identified using the at least one window surrounding a face box for identifying 302 the plurality of face patches, wherein the at least one window size holds the plurality of face patches in a face template centered on the face template size.

In one implementation, the at least one window size is preferably of 36×36, and the face template size is preferably of 24×24.

In one implementation, the pre-defined grid spacing is preferably of size 6×6.

In one implementation, the bounding box is estimated by applying 308 a matrix mask on the image patch map to check at least one face patch from the plurality of face patches are mapped to the at least one face. The bounding box is estimated based on a threshold, wherein the bounding box is preferably of size 36×36, and the threshold is based on the at least one face patch mapped with the at least one face. In one example, the bounding box may be estimated based on a threshold value keeping a tolerance of 4 i.e., if 4 or more types in the mask matching then bounding box of 36×36 is chosen.

In one implementation, searching 206 within the bounding box is a localized searching 206 and is characterized using an aggressive grid spacing of size 1×1.

In one implementation, the non-transitory computer readable storage medium 108 storing instructions performs a patch based approach for plurality of face patches identified for at least one window thereby applying 308 a full face classifier in the bounding box.

In one implementation, wherein training 304 the patch classifier is characterized by use of a decision tree using at least one face patch from the plurality of face patches to identify at least one patch type, and one-vs.-all approach, wherein one-vs.-all approach considers one face patch vs. the rest of face patches.

In one implementation, processing device 102 comprises a processor(s) 104 and a non-transitory computer readable storage medium 108 coupled to the processor(s) 104. The non-transitory computer readable storage medium 108 may have a plurality of instructions stored in it. The instructions are executed using the processor 104 coupled to the non-transitory computer readable storage medium 108.

In one embodiment, the computer system 102 may include at least one processor 104, an interface (s) 106 may be an input/output (I/O) interface, and a non-transitory computer readable storage medium (s) 108. The at least one processor 104 may be implemented as one or more microprocessors, microcomputers, microcontrollers, digital signal processors, central processing units, state machines, logic circuitries, and/or any devices that manipulate signals based on operational instructions. Among other capabilities, the at least one processor 104 is configured to fetch and execute computer-readable instructions stored in the non-transitory computer readable storage medium 108.

The I/O interface 106 may include a variety of software and hardware interfaces, for example, a web interface, a graphical user interface, and the like. The I/O interface 106 may allow the computer system 102 to interact with a user directly or through the client devices (not shown). Further, the I/O interface 106 may enable the computer system 102 to communicate with other computing devices, such as web servers and external data servers (not shown). The I/O interface 106 can facilitate multiple communications within a wide variety of networks and protocol types, including wired networks, for example, local area network (LAN), cable, etc., and wireless networks, such as wireless LAN (WLAN), cellular, or satellite. The I/O interface 106 may include one or more ports for connecting a number of devices to one another or to another server.

The non-transitory computer readable storage medium 108 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 108 may include but is not limited to the plurality of instruction (s). In one implementation the memory may include the face detector 404 which further comprises of plurality of instruction(s) configured to perform operations to detect presence of said at least one face in the one or more images. The operation may include but is not limited to creating 202 an image patch map based on a plurality of face patches identified for at least one window in the one or more images, estimating 204 a bounding box, and searching 206 within the bounding box to detect presence of the at least one face in the one or more images.

In one implementation, the processing device 102 may include storage(s) 402 configured to store at least one image received from the external devices or captured by the processing device 102.

Although the present subject matter is explained considering that the present system 102 is implemented as a processing device 102, it may be understood that the processing device 102 may also be implemented in a variety of computing systems, such as a laptop computer, a desktop computer, a notebook, a workstation, a mainframe computer, a server, a network server, as a software on a server and the like. It will be understood that the processing device 102 may be accessed by multiple users through one or more user devices collectively referred to as user hereinafter, or applications residing on the user devices. Examples of the processing device 102 may include, but are not limited to, a portable computer, a personal digital assistant, a handheld device, and a workstation.

In one implementation, the patch classifier discussed in above sections can be derived using a decision tree or a random forest based classifier. As may be appreciated, other classifiers may be used as well.

The feature representation is by the use of MCT in the present disclosure. As may also be appreciated, other features types may be chosen that have some level of accuracy versus central processing unit (CPU) performance tradeoff.

As may also be appreciated, different weighting can be assigned to different patches. It is possible to use a weight based approach for patch classification where each detected face patch can have a corresponding weighting assigned to that patch. The final output will be summation of that weighting threshold by an empirical value derived during training phase.

Thus, it is well understood by the person skilled in the art that the present disclosure encompasses an idea of using any classifier which works on top of any feature representation to identify face patches and then using a masking system to identify bounding boxes.

Although implementations for a processing device and method for faster face detection have been described in language specific to structural features and/or methods, it is to be understood that the appended claims are not necessarily limited to the specific features or methods described. Rather, the specific features and methods are disclosed as examples of implementations for the processing device and method for faster face detection.

Exemplary embodiments discussed above may provide certain advantages. Though not required to practice aspects of the disclosure, these advantages may include the following.

The present disclosure improves face detection time multi-fold without impacting the accuracy.

The present disclosure may be used in real-time systems even with HD videos/images.

The present disclosure is suitable for generic object detection and not constrained to face domain.

Exemplary embodiments discussed above may provide certain applicable areas of the present disclosure. Though not required to practice aspects of the disclosure, these application of the disclosure may include:

Handheld Terminals/devices: Face detection step is a precursor to any face recognition system. The technique mentioned in this document will make sure that even the low-cost, low-power handheld terminals can have face detection logic inbuilt.

HD Video Surveillance: With HD camera becoming commodity hardware it becomes all the more important to process the HD input video frames at higher speed within the constrained hardware. The technique mentioned here will improve the speed of detection many folds.

Camera auto-focus based on face detection: Cameras with face detection notice when a face is in the frame and then set the autofocus and exposure settings to give priority to the face. Cameras usually have low CPU capability and thus it is more important to achieve HD frame face detection with lower CPU utilization.

Finally, it should be understood that the above embodiments are only used to explain, but not to limit the technical solution of the present application. Despite the detailed description of the present application with reference to above preferred embodiments, it should be understood that various modifications, changes or equivalent replacements can be made by those skilled in the art without departing from the scope of the present application and covered in the claims of the present application.

The invention claimed is:

1. A method for detecting a presence of at least one face in at least one image, comprising:
    creating, by a processing device, an image patch map based on a plurality of face patches identified for at least one window in the at least one image;
    applying a matrix mask on the image patch map to determine a number of face patches of the plurality of face patches mapped to at least a portion of the at least one face;
    estimating, by the processing device, a bounding box based on a threshold, wherein the threshold is based on the number of face patches of the plurality of face patches mapped to the at least the portion of the at least one face; and
    searching, by the processing device, within the bounding box to detect the presence of the at least one face in the at least one image.

2. The method of claim 1, wherein creating the image patch map comprises:
    identifying, by the processing device, the plurality of face patches for the at least one window, wherein the at least one window is a detected face region of the at least one face;
    training, by the processing device, a patch classifier using the plurality of face patches identified; and applying, by the processing device, the patch classifier on the at least one window using a pre-defined grid spacing to create the image patch map.

3. The method of claim 2, wherein a size of the pre-defined grid spacing is 6 pixels by 6 pixels.

4. The method of claim 2, wherein training, by the processing device, the patch classifier comprises using at least one face patch in a decision tree from the plurality of face patches to identify at least one patch type based on a one-vs-all approach that considers one face patch against others of the plurality of face patches.

5. The method of claim 1, wherein the plurality of face patches are identified using the at least one window having a window size that surrounds a face box, and wherein the at least one window holds each of the plurality of face patches in a face template having a face template size less than the window size.

6. The method of claim 5, wherein a window size of the at least one window is 36 pixels by 36 pixels, and wherein the face template size is 24 pixels by 24 pixels.

7. The method of claim 1, wherein searching, by the processing device, within the bounding box comprises a localized searching and is performed using a pre-defined grid spacing of 1 pixel by 1 pixel.

8. A processing device for detecting a presence of at least one face in at least one image, the processing device comprising:
a processor;
a memory coupled to the processor for executing a plurality of instructions present in the memory, wherein execution of the plurality of instructions cause the processor to perform operations comprising:
creating an image patch map based on a plurality of face patches identified for at least one window in at least one image;
applying a matrix mask on the image patch map to determine a number of face patches of the plurality of face patches mapped to at least a portion of the at least one face;
estimating, by the processing device, a bounding box based on a threshold, wherein the threshold is based on the number of face patches of the plurality of face patches mapped to the at least the portion of the at least one face; and
searching within the bounding box to detect the presence of the at least one face in the at least one image.

9. The processing device of claim 8, wherein execution of a further plurality of instructions cause the processor to perform operations comprising:
identifying the plurality of face patches for the at least one window, wherein the at least one window is a detected face region of the at least one face;
training a patch classifier using the plurality of face patches identified; and
applying the patch classifier on the at least one window using a pre-defined grid spacing to create the image patch map.

10. The processing device of claim 9, wherein the plurality of face patches are identified using the at least one window having a window size that surrounds a face box to identify a plurality of face patches, and wherein the at least one window holds each of the plurality of face patches in a face template having a face template size less than the window size.

11. The processing device of claim 10, wherein a window size of the at least one window is of 36 pixels by 36 pixels, and wherein the face template size is of 24 pixels by 24 pixels.

12. The processing device of claim 9, wherein a size of the pre-defined grid spacing is 6 pixels by 6 pixels.

13. The processing device of claim 8, wherein searching within the bounding box comprises a localized searching and is performed using a pre-defined grid spacing of 1 pixel by 1 pixel.

14. The processing device of claim 8, wherein execution of further instructions cause the processor to perform training the patch classifier by:
using at least one face patch in a decision tree from the plurality of face patches to identify at least one patch type based on a one-vs-all approach that considers one face patch against others of the plurality of face patches.

15. The processing device of claim 8, wherein the memory is further configured to store at least one image which is used for detecting the presence of the at least one face.

* * * * *